United States Patent [19]
Rajic et al.

[11] Patent Number: 5,994,700
[45] Date of Patent: Nov. 30, 1999

[54] FTIR SPECTROMETER WITH SOLID-STATE DRIVE SYSTEM

[75] Inventors: Slobodan Rajic, Knoxville; Roland D. Seals; Charles M. Egert, both of Oak Ridge, all of Tenn.

[73] Assignee: Lockheed Martin Energy Research Corporation, Oak Ridge, Tenn.

[21] Appl. No.: 08/923,204

[22] Filed: Sep. 4, 1997

[51] Int. Cl.[6] .............................. G01J 3/26; G01B 9/02; G02B 7/182
[52] U.S. Cl. ...................... 250/339.08; 356/346; 359/224
[58] Field of Search ................. 250/339.08; 356/346; 359/224

[56] References Cited

U.S. PATENT DOCUMENTS

| | | | |
|---|---|---|---|
| 4,871,244 | 10/1989 | Stanley | 359/224 |
| 5,196,902 | 3/1993 | Soloman | 356/346 |
| 5,825,493 | 10/1998 | McGlynn | 356/346 |

OTHER PUBLICATIONS

Griffiths, Peter R., and de Haseth, James A., "Two–Beam Interferometers," Chap. 4, *Fourier Transform Infrared Spectrometry,* A Wiley–Interscience Publication, John Wiley & Sons, Inc., 1986.

Griffiths, Peter R., and de Haseth, James A., "Auxiliary Optics for FT–IR Spectrometry," Chap. 5, *Fourier Transform Infrared Spectrometry,* A Wiley–Interscience Publication, John Wiley & Sons, Inc., 1986.

*Primary Examiner*—Constantine Hannaher
*Assistant Examiner*—Albert Gagliardi
*Attorney, Agent, or Firm*—Quarles & Brady LLP

[57] ABSTRACT

An FTIR spectrometer (10) and method using a solid-state drive system with thermally responsive members (27) that are subject to expansion upon heating and to contraction upon cooling. Such members (27) are assembled in the device (10) so as to move an angled, reflective surface (22) a small distance. The sample light beam (13) is received at a detector (24) along with a reference light beam (13) and there it is combined into a resulting signal. This allows the "interference" between the two beams to occur for spectral analysis by a processor (29).

18 Claims, 2 Drawing Sheets

FTIR SPECTROMETER WITH SOLID-STATE DRIVE SYSTEM

STATEMENT REGARDING FEDERALLY SPONSORED RESEARCH

This invention was made with Government support under Contract No. DE-AC05-840R21400 awarded by the U.S. Dept. of Energy. The Government has certain rights in the invention.

TECHNICAL FIELD

The field of the invention is two-beam interferometers, and more particularly, Fourier transform spectrometers for the measurement of infrared spectra, also known as FTIR spectrometers.

DESCRIPTION OF THE BACKGROUND ART

The design of most interferometers used for infrared spectrometry today is based on the two-beam interferometer originally designed by Michelson in 1891. The simplest version of the Michelson interferometer consists of two plane mirrors, one of which is situated perpendicular to the plane of the other, with a beamsplitter between them.

The movable mirror is either moved at a constant velocity or is held at equally spaced points for fixed short time periods and rapidly stepped between these points. Between the fixed mirror and the movable mirror is a beamsplitter, where a beam of light from an external source is partially transmitted to the fixed mirror and partially transmitted to the movable mirror. The split beams are then reflected back to the beamsplitter, where they interfere and are again partially reflected and partially transmitted. The instantaneous intensity of each beam returning to the detector depends on the difference in the path length traveled by the beams in the two arms of the instrument. The difference in intensity of the two beams as a result of their respective distances of travel yields a recombined wave with the spectral information that can be analyzed by a Fourier transform spectrometer.

The interferometer has two primary components, a drive mechanism for moving the mirror, and a beamsplitter. A high quality drive mechanism is required to obtain high resolution and the high maximum wavenumber in the spectrum. The use of simple drive mechanisms has restricted the device to use at low and medium resolution.

High resolution spectrometers have traditionally been large in size. The use of smaller spectrometers in recent years has required compromise of the resolution performance of the instruments.

The ability to perform high resolution analysis, over a large spectral region, in a very small package, has previously not been possible.

SUMMARY OF THE INVENTION

The present invention provides a FTIR spectrometer with a solid-state drive system. In a preferred embodiment, the invention utilizes thermally responsive members that are subject to expansion upon heating and subject to contraction upon cooling. Such members operate to move a movable reflective surface a small distance. This change in position of the movable reflective surface is a basic operation in spectrometers which provides the necessary change of phase in the sample light beam. The sample light beam is typically received at a detector along with a reference light beam and there combined into a resulting signal. This allows the "interference" between the two beams to occur.

The present invention accomplishes this objective without the use of motors, gears and other moving parts which are subject to friction and wear during use.

The invention more particularly provides an apparatus having a substantially rigid supporting body, a beamsplitter positioned on said supporting body to direct a reference beam along a first path and a sample beam along a second path, one or more structural members positioned in said supporting body to move a support for a movable reflective surface when said members are subjected to thermal expansion as a result of heating, and a detector for receiving a reflected reference beam of light traveling along the first path and a reflected sample beam of light traveling along the second path.

The invention is also practiced as a method in which a reference beam of light is directed through a body having a first entry region for said reference beam of light and in which said reference beam of light is further directed along a first path through said body to a detector, and in which the body has a plurality of integral structural members. A sample beam of light is directed through a second entry region in said body and along a second path through said body. A movable reflective surface is disposed opposite said second entry region for reflecting the sample beam of light along the second path until said sample beam is received at the detector, and the movable reflective surface is moved in response to a change of dimension of at least one of the integral structural members without motors or drive systems having moving mechanical parts. The reference beam of light and the sample beam of light are then received and combined at a detector for input to a spectral analysis processor.

In more particular embodiments of the invention, the structural members are formed of an aluminum alloy material having a high coefficient of thermal expansion. When heat from a heater is applied to these members, they extend their longitudinal dimension and move the angled reflective surface on which the sample light beam impinges a slightly greater distance from the entry region of the spectrometer by extending the light path of the sample beam and changing its phase relative to the reference beam.

The present invention is applicable to Fourier transform infrared spectrometers of high sensitivity. In this type of instrument, the source of light should have a broad band of frequencies and the detector and the signal analyzer should also be capable of Fourier analysis over a large range of frequencies. It is further preferred that the light beams, both the reference light beam and the sample light beam, be reflected on the order of 100 to 300 times to provide a suitable length to the path of light for control of the phase change of the sample beam in relation to the reference beam.

Other objects and advantages, besides those discussed above, will be apparent to those of ordinary skill in the art from the description of the preferred embodiment which follows. In the description, reference is made to the accompanying drawings, which form a part hereof, and which illustrate examples of the invention. Such examples, however, are not exhaustive of the various embodiments of the invention, and, therefore, reference is made to the following claims which follow the description for determining the scope of the invention.

DETAILED DESCRIPTION OF THE PREFERRED EMBODIMENT

Figure 1:
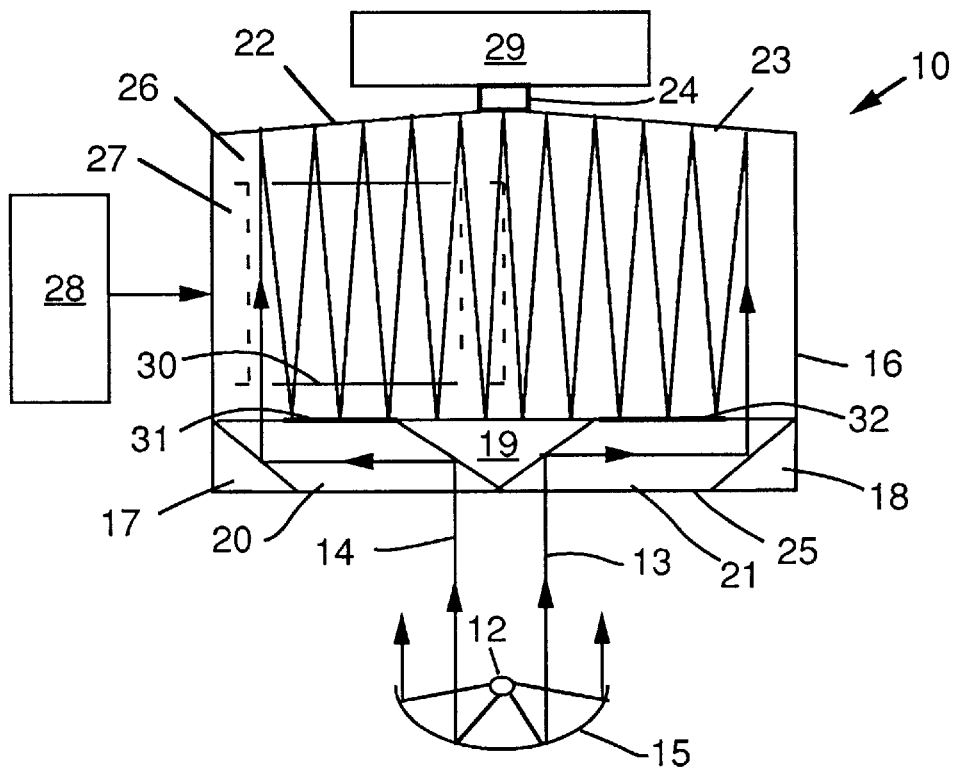
FIG. 1 is a side view in elevation of an FTIR spectrometer that incorporates the present invention.
Figure 2:
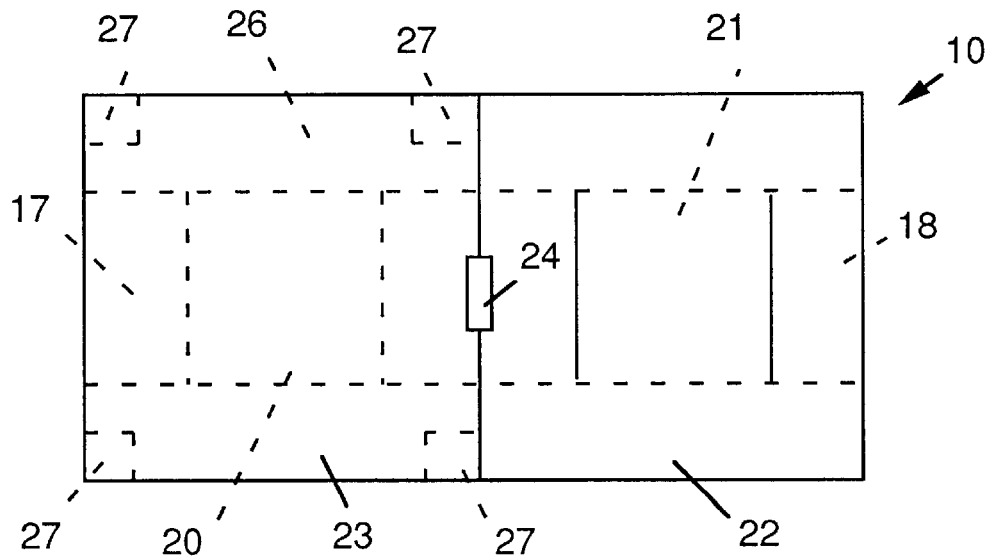
FIG. 2 is a top schematic view of the FTIR spectrometer of FIG. 1.
Figure 3:
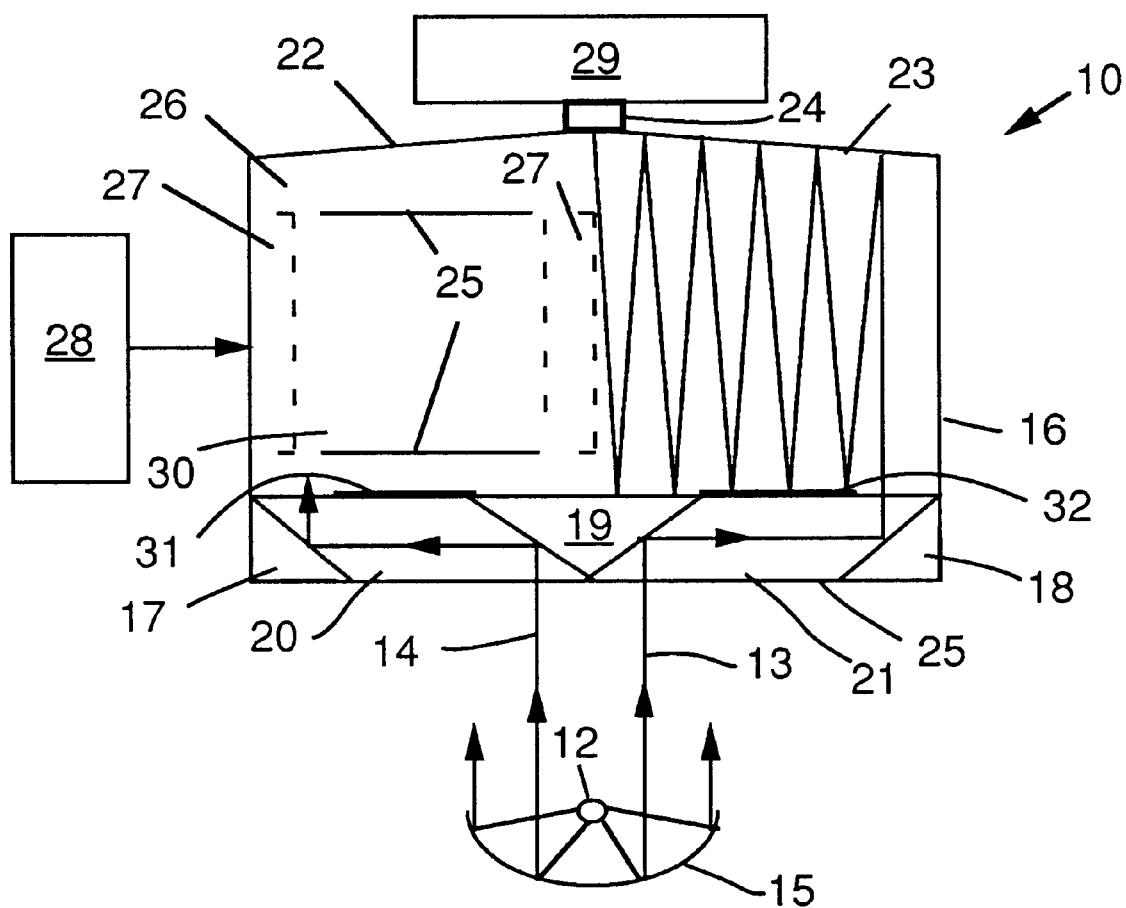
FIG. 3 is a side view in elevation of the FTIR spectrometer of FIG. 1, with the reference beam removed to allow view of the internal structure of the device.

Referring to FIGS. 1–3, the invention is incorporated in an FTIR spectrometer, represented generally by reference number 10. As shown in FIG. 1, there is a light beam source 12 from which a reference beam 13 and a sample beam 14 are reflected from a reflector 15 upward through a bottom of the spectrometer 10. It should be appreciated that the terms "top, side and bottom" are relative to the preferred embodiment, but in other embodiments, the light could be directed in from the top or from the side of the device. It should also be understood that the term "light" is used broadly to encompass radiated waves in both visible and nonvisible regions of the radiation spectrum.

The spectrometer 10 has a substantially rigid, supporting body 16. At opposite bottom side edges of the body 16 are a pair of turning prisms, 17, 18. At a midpoint between the turning prisms, also along the bottom of the body 16, is a wedge-shaped beamsplitter 19 that is adhered to the body 16. Between the beamsplitter 19 and the turning prisms 17, 18 are two respective infrared light-transmissive optical elements of filler material 20, 21, which provide entry regions for the reference beam 13 and the sample beam 14. These optical elements 20, 21 are coated on the bottom with a broadband anti-reflective coating 25 to prevent fresnel reflections and on the top with a coating which provides reflective surfaces 31, 32 for light beams 14, 13, respectively. These optical elements 20, 21 also maintain the rigid, solid structure of the spectrometer 10.

The optical elements 20, 21 are preferably made of a material having light-transmissive properties for light in the appropriate spectrum of frequencies. For infrared spectra, such materials include zinc sulfide, zinc selenide, sodium chloride and sapphire.

At the top of the body 16, there are two slightly angled reflective surfaces 22, 23, which are inclined at a slight angle relative to the side walls of the body 16. A light detector 24 is located at the apex formed where the slight angled light reflective surfaces 22, 23 meet. The reference beam 13 impinges upon one angled surface of the beam splitter 19, is reflected to the turning prism 18 and is then reflected toward the angled reflective surface 23. It then bounces (is reflected) back to surface 32 of element 21 and back to the reflective surface 23 a number of times, at least one hundred and preferably as high as two hundred to three hundred before being received at detector 24. This provides an extended length to the light-transmissive path within the spectrometer device 10.

The sample beam 14 impinges upon an opposite angled surface of the beam splitter 19, is reflected to the turning prism 17, and is then reflected toward the angled reflective surface 22. It then bounces (is reflected) back to reflective surface 31 of element 20 and back to the movable reflective surface 22 a number of times, at least one hundred and preferably as high as two hundred to three hundred times before being received at detector 24. This provides an extended length to the light-transmissive path within the spectrometer device 10, similar to the path for the reference beam 13.

As explained above, it is desired to change the position of the reflective surface 22, to change the phase of the light wave received at detector 24 in relation to the reference wave. This change in position of the reflective surface is a basic operation in spectrometers which provides the necessary change of phase in the sample light beam. This allows the "interference" between the two beams 13, 14 to occur. The combination of the reference light wave 13 and the sample light wave 14 is an input to a processor, represented generally by reference number 29, for performing Fourier spectral analysis of combined light waves.

In the present invention, the reflective surface 22 is supported by one or more transverse members 26, which in turn are supported by four upright drive members 27 of an aluminum alloy having a high coefficient of thermal expansion, approximately $10 \times 10^{-6}$ in./in. ° F. or greater. In alternative embodiments, the members 27 can be made of a thermally contractive cooling junction material or resistance heating materials. A heating and cooling system 28 (represented schematically in FIGS. 1 and 3) is in electrical or thermal contact with the drive members 27 (represented by the arrow in FIGS. 1 and 3), to cause heating and thermal elongation of the drive members 27, and later cooling and thermal contraction of the members 27. The elongation of the members 27 moves the reflective surface 22 a short distance to obtain the necessary change of wavelength and change of phase of the sample wave 14 relative to the reference wave 13.

The above-described drive system using members 27 and heating and cooling system 28 avoids the use of moving parts which are subject to friction and wear. The device 10 requires only electrical power or some other source of power for controlling heating and cooling. With relative small temperature changes, the path of light can be increased by several mm. While the movable reflective surface 22 is moved only a fraction of this distance, the length of the optical path will be increased by a multiple depending on the number of reflections.

The spectrometer 10 (FIG. 3) also includes a cavity 30 in the half section in which the sample wave travels. This enables identification of test materials placed in the cavity 30, based on the analysis of frequencies of the light that are transmitted or attenuated by the test material and comparison of these spectral results with spectra for known materials. The walls of the cavity 30 are coated with the broadband, anti-reflective coating 25 to prevent fresnel reflections.

The spectrometer of the present invention can be made to a size on the order of one cubic inch, which is at least two orders of magnitude smaller than the smallest known FTIR spectrometric device. It has advantages in manufacture, being an assembly with all substantially fixed, passive parts and no moving parts in the classical sense. The invention provides a device with high sensitivity due to the multiple reflections of the light beams, as described above.

The device is monolithic in structure and various versions are possible having different geometries, light sources and detectors, while still incorporating the features disclosed herein. Therefore, reference is made to the claims which follow for defining the legal scope of the invention.

We claim:

1. A dual beam interferometer having a processor for Fourier spectral analysis of light waves, including light waves of frequencies in the infrared spectrum, said apparatus comprising:

a substantially rigid supporting body, a beamsplitting structure positioned on said rigid body to direct a reference beam of light along a first path, and to direct a sample beam of light along a second path, a first reflective surface and a second reflective surface each being located to receive and reflect the sample beam of light a plurality of times back and forth between said first reflective surface and said second reflective surface, and at least one structural member positioned in said supporting body to move a support for said first reflective surface relative to said second reflective surface when said at least one structural member is subjected to a change in elongation based on thermal, non-resistance heating or cooling of the structural members, and a detector for receiving said reference beam of light traveling along the first path and a reflected sample beam of light traveling along the second path, said detector operating as an input to the processor that performs spectral analysis of a combination of said reference beam of light and said sample beam of light.

2. The interferometer of claim 1, wherein the structural members are thermally expansive members with a coefficient of thermal expansion of approximately $10 \times 10^{-6}$ in./in. °F. or greater.

3. The interferometer of claim 2, wherein the structural members are made of an aluminum alloy material.

4. The interferometer of claim 3, wherein there are four structural members.

5. A dual beam interferometer having a processor for Fourier spectral analysis of light waves, including light waves of frequencies in the infrared spectrum, said apparatus comprising:

a substantially rigid supporting body;

a beamsplitting structure positioned on said rigid body to direct a reference beam of light along a first path, and to direct a sample beam of light along a second path;

a first reflective surface and a second reflective surface each being located to receive and reflect the sample beam of light a plurality of times back and forth between said first reflective surface and said second reflective surface;

at least one structural member positioned in said supporting body to move a support for said first reflective surface relative to said second reflective surface when said at least one structural members are subjected to a change in elongation based on changing thermal conditions;

a detector for receiving said reference beam of light traveling along the first path and a reflected sample beam of light traveling along the second path, said detector operating as an input to the processor that performs spectral analysis of a combination of said reference beam of light and said sample beam of light; and wherein said first reflective surface is formed by a first angled reflective surface extending from a side wall of the supporting body to said detector and extending at an angle relative to perpendicular to the second path for the sample beam of light.

6. The interferometer of claim 5 further comprising a second angled reflective surface extending from a side wall opposite said first angled surface to said detector and extending at an angle relative to perpendicular to the first path for the reference beam of light.

7. The interferometer of claim 5, further comprising a cavity formed along said second path for said sample beam of light, said cavity being large enough to hold a sample material to be identified though spectral analysis.

8. A method comprising the steps of:

directing a reference beam of light through a body having a first entry region for said reference beam of light and further directing said reference beam of light along a first path through said body to a detector, wherein said body has a plurality of integral structural members and no substantially moving parts;

directing a sample beam of light through a second entry region in said body and along a second path through said body;

supporting a movable reflective surface opposite said second entry region for reflecting the sample beam of light along the second path until said sample beam is received at the detector;

moving the movable reflective surface opposite the second entry region for the sample beam of light in response to a change of dimension of at least one of the integral structural members in response to thermal, non-electrical resistance heating or to cooling and without motors or drive systems having moving mechanical parts; and receiving and combining the reference beam of light and the sample beam of light at a detector for input to a spectral analysis processor.

9. The method of claim 8, wherein the movable reflective surface is disposed at an angle relative to perpendicular to travel of the sample beam of light.

10. The method of claim 8, wherein the movable reflective surface is moved by cooling at least one of the integral structural members.

11. The method of claim 8, wherein the sample beam of light is directed through a cavity for holding a material to be identified by spectral analysis.

12. The method of claim 8, wherein said sample beam of light is directed to a beamsplitter, then through a solid light-transmissive element to a turning prism and then into an interior of the body.

13. The method of claim 8, wherein said sample beam is reflected in a range from 100–300 times between entry into the body and reception at the detector.

14. A method comprising the steps of:

directing a reference beam of light through a body having a first entry region for said reference beam of light and further directing said reference beam of light along a first path through said body to a detector, wherein said body has a plurality of integral structural members and no substantially moving parts;

directing a sample beam of light through a second entry region in said body and along a second path through said body;

supporting a movable reflective surface opposite said second entry region for reflecting the sample beam of light along the second path until said sample beam is received at the detector;

moving the movable reflective surface opposite the second entry region for the sample beam of light in response to a change of dimension of at least one of the integral structural members without motors or drive systems having moving mechanical parts;

receiving and combining the reference beam of light and the sample beam of light at a detector for input to a spectral analysis processor; and wherein said sample beam of light is directed to a beamsplitter, then through a solid light-transmissive element to a turning prism and then into an interior of the body.

15. The method of claim 14, wherein the movable reflective surface is disposed at an angle relative to perpendicular to travel of the sample beam of light.

16. The method of claim 14, wherein the movable reflective surface is moved by producing heat in at least one of the integral structural members.

17. The method of claim 14, wherein the sample beam of light is directed through a cavity for holding a material to be identified by spectral analysis.

18. The method of claim 14, wherein said sample beam is reflected in a range from 100–300 times between entry into the body and reception at the detector.

* * * * *